Aug. 15, 1933.  J. RUHLAND  1,922,176
AUTOMATIC HAY UNLOADER
Filed May 9, 1932   4 Sheets-Sheet 1

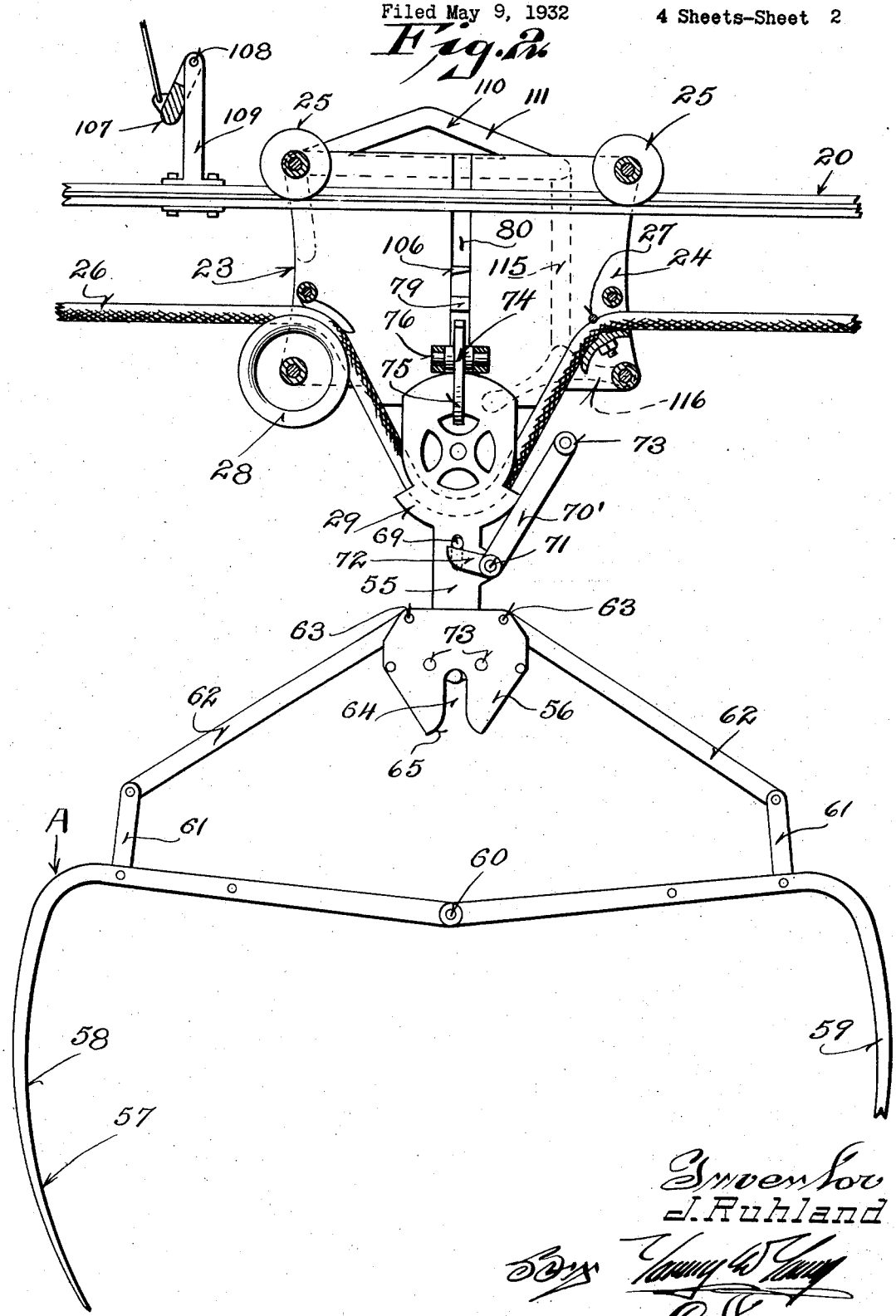

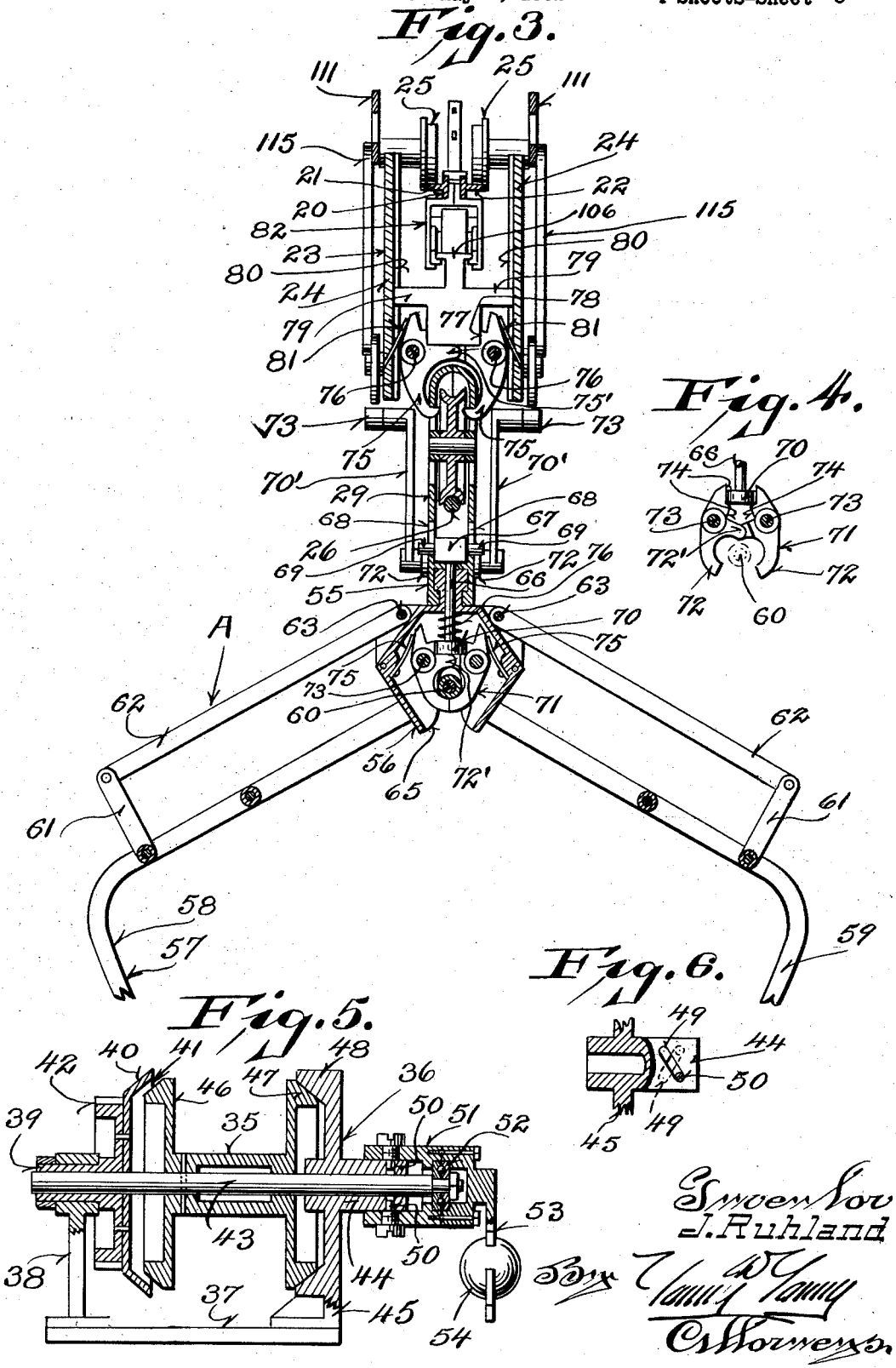

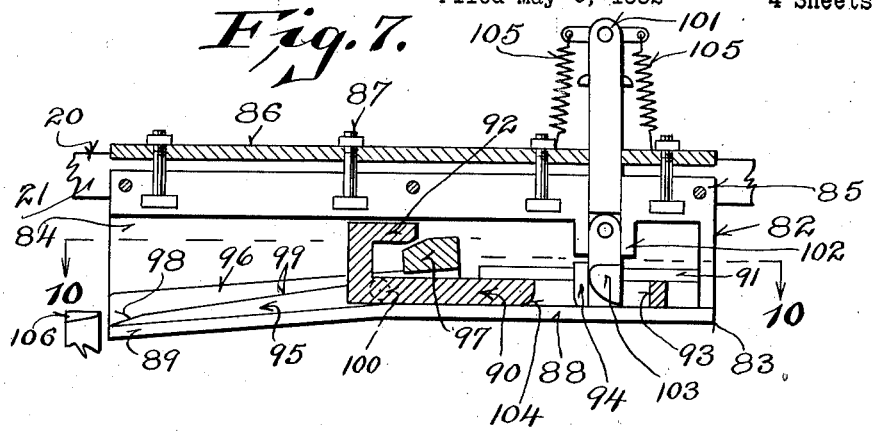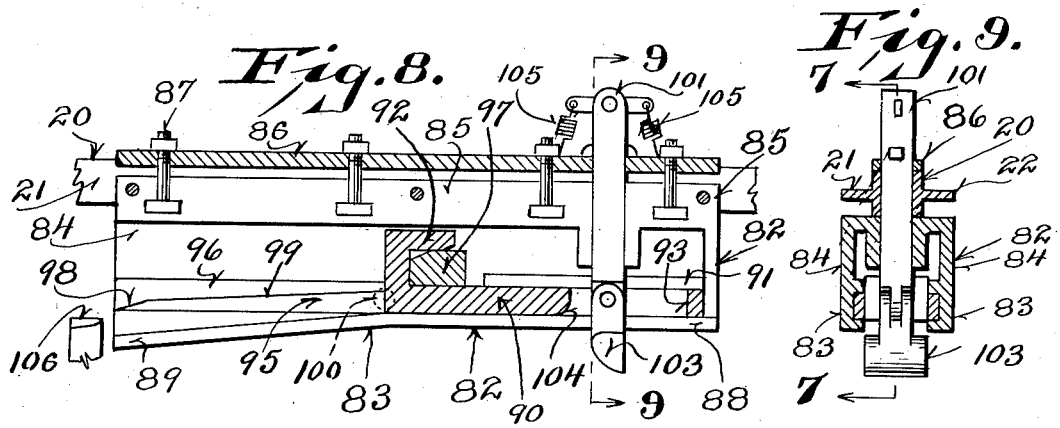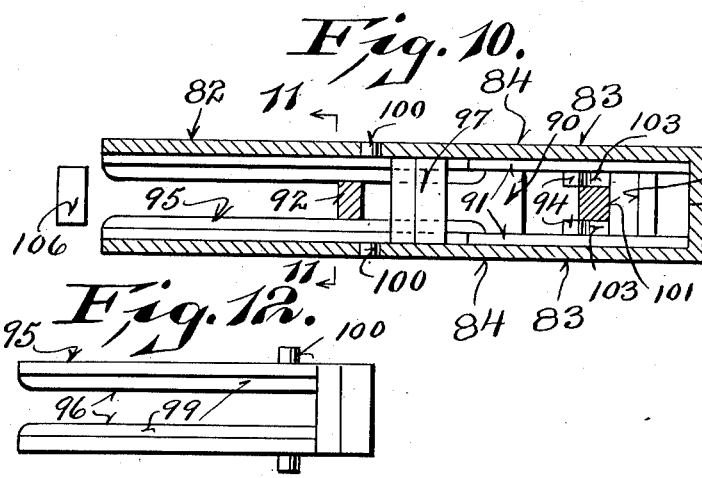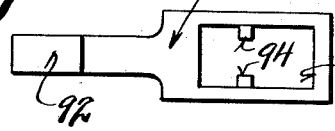

Patented Aug. 15, 1933

1,922,176

UNITED STATES PATENT OFFICE 1,922,176

AUTOMATIC HAY UNLOADER

Joseph Ruhland, Plain, Wis.

Application May 9, 1932. Serial No. 610,047

5 Claims. (Cl. 212—93)

This invention appertains to hoisting and conveying mechanism and more particularly to a novel means for handling hay or similar material.

One of the primary objects of my invention is to provide an improved hay carrier or unloader embodying a novel hay grapple or fork, with novel means for automatically raising the fork after receiving the load and for carrying the fork to the desired location where the load is to be dumped and for releasing the fork, so that the hay can be dumped without attention on the part of the operator.

Another prime object of my invention is to provide a hay carrier embodying an overhead track on which the grapple or fork is slidably mounted for transporting the load from the stack, novel means being provided for releasing the fork to permit the same to lower when the fork reaches the stack, which is to be transported.

A further object of my invention is the provision of means whereby the grapple or fork can be automatically moved to either side of the stack, so that the hay can be effectively carried to the desired point irrespective of the location of the stack.

A further object of my invention is the provision of a novel winding drum for pulling the hay grapple or fork to one position against the action of the counter-balancing weights, the drum being so constructed as to permit the release of the fork so that the same can travel by the action of the weights or held in any desired location against movement under the influence of the weights.

A further object of my invention is the provision of novel means arranged at different predetermined points on the track for cooperation with the grapple or fork for automatically actuating the fork to permit the release of the load carried thereby, said means being selectively actuated from a central point convenient to the operator of the device.

A further object of my invention is the provision of a novel stop arranged on the track in predetermined position relative to the hay stack for actuating the grapple to permit the lowering thereof automatically for engaging the load, the stop being so constructed as to permit the passage of the grapple thereby when the load is being transported to the opposite side of the stop from the stack.

A still further object of my invention is to provide an improved carrier and hoist of the above character, which will be durable and efficient in use, one that will be simple and easy to manufacture and one which can be placed on the market at a reasonable cost.

With these and other objects in view, the invention consists in the novel construction, arrangement and formation of parts, as will be hereinafter more specifically described, claimed and illustrated in the accompanying drawings, in which drawings:

Figure 2 is an enlarged side elevation of the hay fork or grapple showing the same with its jaws in open position, parts of the carrier being shown broken away and in section.

Figure 3 is a view taken at right angles to Figure 2 through the improved carrier showing the jaws in their closed position for gripping a load, the carrier being shown positioned on the supporting track.

Figure 4 is a detail sectional view illustrating the means for holding the jaws of the grapple in their closed position.

Figure 5 is a longitudinal section through the improved winding drum utilized in conjunction with my hay carrier and hoist.

Figure 6 is a detail fragmentary view illustrating the means for shifting the drum to bring about the braking thereof or the positive driving thereof.

Figure 7 is an enlarged longitudinal section through the novel stop for the carrier showing the same secured to the supporting track the view illustrating the parts of the stop in their normal position for permitting the release of the grapple so that the same can move to a lower position for engaging the load.

Figure 8 is a similar view showing the position of the parts to permit the passage of the grapple and carrier to the opposite side of the stop from the stack.

Figure 9 is a transverse section through the improved stop taken on the line 9—9 of Figure 8 looking in the direction of the arrows.

Figure 10 is a horizontal section through the improved stop taken on the line 10—10 of Figure 7 looking in the direction of the arrows.

Figure 11 is a transverse section through the stop taken on the line 11—11 of Figure 10 looking in the direction of the arrows.

Figure 12 is a detail top plan view of the pivot release trip of the stop.

Figure 13 is a detail top plan view of the sliding block forming a part of the stop.

Figure 1:
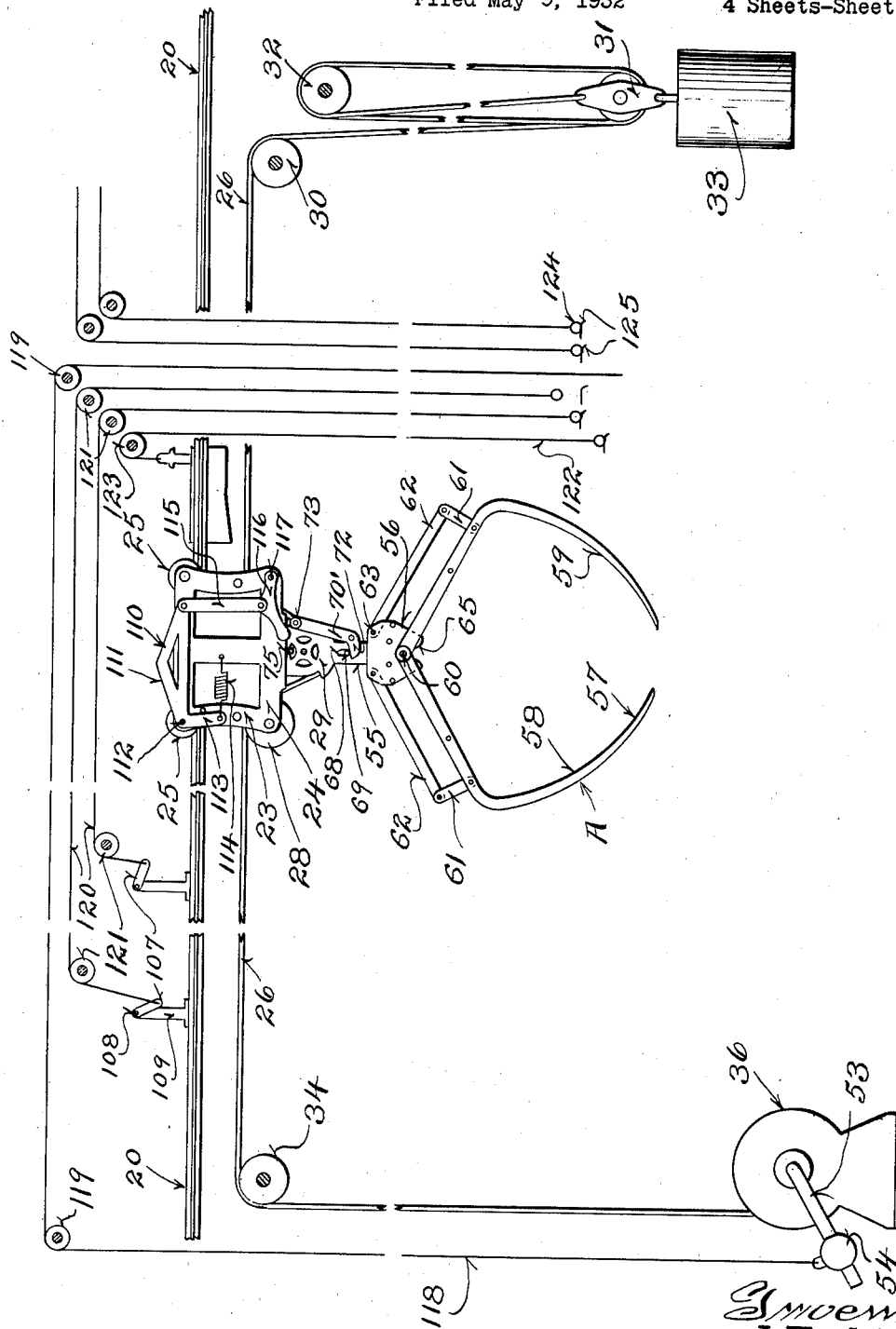
Figure 1 is a fragmentary side elevation of my improved hay hoist and carrier, parts of the device being shown diagrammatically and in section.

Referring to the drawings in detail, wherein similar reference characters designate the corresponding parts throughout the several views the letter A generally indicates my improved hay hoist and carrier which comprises an overhead track 20. This track is held in its raised elevated position in any preferred manner. As shown, the track 20 embodies a pair of slightly spaced rails 21 and 22 which are of a substantially T shape in cross section, the heads of the T's being disposed in facing relation.

The track 20 slidably supports my novel carrier 23, which comprises a frame embodying spaced side plates 24, which are rigidly connected together in any preferred manner. The upper ends of the plates 24 carry at their corners the supporting wheels or rollers 25, which engage the outstanding flanges of the rails 21 and 22. The rollers or wheels 25 are preferably flanged so as to prevent the accidental displacement of the carrier or carriage 23 from off of the track.

Extending between the frame plates 24 of the carriage is the pulley cable 26 and this cable extends on opposite sides of the carriage and leads to the opposite ends of the barn or other location where the device is being used. The frame plates 24 at one side carry a clamp 27 for gripping the cable 26, so that the cable will be rigidly fastened thereto. The opposite sides of the frame plates carry an idle pulley 28 over which is trained the pulley cable. The intermediate portion of the cable between the clamp 27 and the idle pulley 28 receives a pulley block 29 and the pulley wheel of the block rests upon this cable as is clearly shown in Figure 3 of the drawings. The cable 26 on the right-hand side of the carriage (referring to Figure 1 of the drawings) is trained over an idle pulley 30 and extends down under a traveling idle pulley block 31 and thence over a supported idle pulley wheel 32. The cable can be looped the desired number of times around the pulleys 31 and 32 and the free end thereof is finally attached to a weight 33 of the desired mass for pulling the carriage over the track as will be later set forth.

The cable 26 leads from the idle pulley 28 carried by the carriage to a supported idle pulley 34 and thence downward to the reel 35 of my novel winding drum 36.

The winding drum 36 may embody a base plate 37 supporting a bearing bracket 38. Journalled in the bearing bracket 38 is a hollow shaft 39 connected with the female section 40 of a clutch 41. Secured to the clutch section 40 is a spur gear 42 and this spur gear may be driven from any suitable source of power such as an electric motor. Freely mounted within the tubular shaft 39 for rotation is the supporting shaft 43. The shaft 43 is also rotatably mounted in a bearing 44 carried by a standard 45 formed on the base 37. The reel 35 is keyed or otherwise secured to the shaft 43 for rotation therewith and one end flange of the reel has formed thereon the male section 46 of the clutch 41 for movement into and out of the female section 40. The opposite flange of the reel 35 has formed thereon a brake drum 47 for movement into and out of a brake housing 48 formed on the standard 45. By referring to Figure 6 of the drawings, it will be noted that the bearing 44 is provided with oppositely directed inclined grooves 49 in which ride pins 50 carried by the sleeve 51. This sleeve 51 is rotatably mounted on the shaft 43 and I prefer to place a roller or ball-bearing journal 52 between the sleeve and the shaft 43. The race-way of the ball-bearing journal 52 is connected to the shaft 43 and the sleeve 51 against lateral shifting movement, so that longitudinal movement of the sleeve 51 will be imparted to the shaft 43. This permits the reel to be moved to a neutral position with the brake drum 47 out of position with the brake housing 48 and the clutch section 46 out of engagement with the clutch section 40 or the brake drum into braking position with the brake housing or the clutch section 46 into driving contact with the clutch section 40. Secured to the sleeve 51 is a crank arm 53 on which is adjustably mounted a weight 54. Obviously upon rotation of the sleeve, the pins 50 riding in the inclined ways 49 will shift the shaft 43 longitudinally for changing the position of the reel. The crank arm 53 and the weight 54 are so arranged as to normally shift the reel 35 to the right (referring to Figure 5 of the drawings) so that the reel will be normally held against rotation by the braking engagement of the drum 47 and the housing 48.

When the reel is power driven, the cable 26 will be wound up thereon and consequently, the carriage 23 will be moved to the left (referring to Figure 1 of the drawings) drawing the weight 33 to an elevated position. When the reel is in its neutral position, the weight 33 will lower by the action of the gravity and move the carriage 23 to the right paying the cable 26 from off of the reel 35. When the reel is in its braking position, the carriage will be held against movement.

Referring again to the carriage 23, it will be noted that the pulley block 29 has formed thereon and depending therefrom an arm 55 which carries the head 56 of the grapple or hay fork 57. The grapple or hay fork 57 embodies a pair of like jaw members 58 and 59, which are of a substantially L shape in end elevation. The inner ends of the jaw members 58 and 59 are pivotally connected together by means of a cross rod 60. Connected with the jaw members on each side of the cross rod 60 are upstanding arms 61 to which are pivotally secured the inwardly directed links 62, which are in turn pivoted as at 63 to the upper corners of the head 56. The intermediate portion of the head 56 is provided with a slot 64, for the reception of a portion of the cross rod 60, for a purpose, which will be later more fully set forth. The slot 64 is preferably provided with a flaring mouth 65 so as to facilitate the free entrance of the cross rod into the same.

Slidably mounted within the arm 55 and the heat 56 is a release rod 66 having formed or secured to its upper end a guide block 67. This guide block 67 slidably engages the inner sides of the arm 55 and the arm 55 can be provided with slots 68 for receiving the guide pins 69 formed on the guide block. Formed on the lower end of the release rod 66 is the release and lock head 70. This release and lock head 70 cooperates with a gripping clamp 71 for engaging the cross rod 60 to hold the jaws of the grapple or hay fork in their closed gripping position. This clamp 71 embodies a pair of companion jaws 72 pivoted intermediate their ends on pivot pins 73 carried by the head 56 on each side of the slot 64. The active faces of the jaws 72 are normally held into gripping contact with one another and the cross rod 60 by engagement of the release and lock head 70 with shoulders 74 formed on the clamping jaws 72. The upper ends of the jaws have bearing against the same leaf springs 75 which normally tend to move the active faces of the jaws away from one another to release the cross rod 60. Thus, as soon as the release and lock head 70 is moved from out of engagement with the shoulders 74, the jaws will function to release the cross rod. A coil spring 76 is placed around the release rod 66 and disposed between the release and lock head 70 and the upper end of the supporting head 56. Thus, the release rod and the release and lock head 70 are normally urged to a lowered position into engagement with the clamp.

In order to raise the release rod 66 so as to move the lock and release head 70 above the shoulders 74, I provide a bell crank shaped operating lever 70'. This lever is rockably mounted at its angle, as at 71 on the arm 55. The short arm 72 of the lever engages under the guide pin 69 and the upper ends of the long arms of the levers can be provided with manipulating handles 73. Thus, upon downward pulling movement on the handles 73 the bell crank lever 70 will be rocked for lifting up on the shoulders 74 and the release rod 66.

By referring to Figures 2 and 3 of the drawings, it will be noted that the weight of the grapple on the cable 26 will normally tend to pull the cable down between the clamp 27 and the idle pulley wheel 28 when the reel 35 of the drum is in its neutral position. To prevent downward movement of the grapple under normal conditions I provide a holding clamp 74. This clamp 74 is constructed similar to the clamp 71 and embodies a pair of companion gripping jaws 75 pivoted intermediate their ends on pivot pins 76 carried by the frame 23 of the carriage. These gripping jaws are provided with gripping faces for engaging the pulley block and are held in their engaged position therewith by means of a release block 77 engaging the shoulders 78 formed on the jaws 76 above their pivots. The release block 77 is provided with outwardly extending arms 79, which are mounted in guide-ways 80 formed on the inner faces of the frame plates 24. Leaf or similar springs 81 engage the upper ends of the jaws 76 and normally tend to rock the jaws on their pivots away from the pulley block so as to release the same when the release block 77 is moved from its lowered position. I provide novel means for operating the release block 77 and this means comprises a stop 82 secured to the track 20. The stop 82 embodies a supporting frame which includes a pair of like sections 83. Each of the sections 83 includes a side wall 84 and inwardly directed flanges 85 which are disposed between the rails 21 and 22 of the track. A supporting plate 86 is arranged on top of the rails and carries the depending bolts 87, the heads of which are fitted within mating sockets formed in the flanges 85. By this construction and arrangement of parts the stop 82 can be disposed at any desired point on the track 20. The lower edges of the side plates 84 are provided with inwardly directed guide flanges 88 which are arranged in spaced relation to one another and these flanges are inclined downwardly toward one end of the stop as indicated by the reference character 89. Slidably mounted within the frame of the stop is the stop block 90. This block is mounted on the flanges 88 and can be retained thereon for sliding movement by short ribs 91. The forward end of the stop block 90 is reduced in cross section and is provided with a hook-shaped extension 92. The body portion of the stop block 90 is provided with an orifice 93 the side walls of which carry inwardly directed lugs 94. Associated with the stop block 90 is the trip arm 95. The trip arm 95 embodies a pair of spaced parallel side portions 96 connected at their rear ends by a raised bridge piece 97, which normally rests upon the top face of the stop block 90. As shown, the bridge piece 97 is adapted to ride under the hooked end 92 of the stop block under some conditions. The extreme forward ends of the side portions 96 of the trip 95 are preferably tapered as at 98 and the inner faces of the side portions are provided with guide flanges 99, for a purpose which will be also hereinafter more fully set forth. Laterally extending pivot pins 100 are formed on the release arm and these pivot pins are pivotally mounted in the sides of the frame.

Slidably mounted in the frame for vertical movement is a release rod 101. A suitable guide 102 is provided for the release rod and this guide terminates above the upper face of the release block 90. Pivotally secured to the lower end of the release rod is a swinging nose 103 which is adapted to extend through the orifice 93 formed in the stop block 90. The tapered portion of the nose 103, when the release rod 101 is in its lowered position, is adapted to cooperate with the curved face 104 of the stop block for sliding the stop block in the frame, the purpose of which will also be more fully described. The release rod is normally urged to a lowered position with the nose 103 extending through the orifice 93 of the stop block by means of contractile coil springs 105.

Considering that the stack is intermediate the ends of the supporting track 20 with the stop 82 above the same, when it is desired to obtain a load of hay from the stack and to transport the same to either end of the track, the crank arm 53 of the drum is raised, so as to move the reel 35 to a neutral position. Thus, if the carriage 23 is at the left-hand end of the track, referring to Figure 1 of the drawings, the weight 33 will function to draw the carriage 23 toward the hay stack and the stop 82. As the carriage reaches the stop, the head 106 formed on the upper end of the release block 77 will engage the release arm 95 and ride up on the inclined surface thereof. This will raise the release block 77 from out of engagement with the shoulders 78 and allow the clamp 76 to release the pulley block 55. As the reel 35 of the drum is free, the weight of the grapple will pull down on the cable 26 and allow the grapple to engage the hay. After the grapple engages the desired amount of the load, the jaws are swung together manually and the cross rod 60 of the grapple rides into the slot 64 and engages ears 72' on the jaws 72, causing the closing of the clamping jaws 72 on the cross rod 73. Upon downward movement of the release and lock head 70, the same will engage the shoulders 73 and hold the jaws 72 against further movement.

If the load is to be moved to the left, the crank arm 53 is further raised so as to engage the clutch sections 40 and 46. This will rotate the reel 35 and wind up the cable 26. Upon initial movement of the cable 26 the pulley block 29 and the grapple will be raised above the hay stack and the pulley block will ride between the open jaws 75 of the clamp 76, and strike the ears 75' causing the closing of the jaws 75. Upon continued movement of the reel the cable 26 will pull the carriage and grapple to the left and as soon as the head 106 rides off the release arm 95, the release block 77 will be lowered for engaging the shoulders 78 to hold the jaws 75 of the clamp 76 in their engaged position.

After the carriage has reached the desired location where the load is to be dumped, the grapple is automatically released to permit the load to fall from between the jaws of the grapple. I provide novel means for automatically dumping the load at the desired location and this means comprises a series of spaced trip levers 107 located adjacent to each end of the track. These trip levers 107 are pivotally mounted as at 108 on supporting standards 109 which are rigidly secured to the track. These levers are moved into and out of the path of tripping mechanism 110 arranged on the carriage 23. The tripping mechanism 110 embodies a shoe 111. The shoe 111 has its opposite faces inclined in opposite directions and one end of the shoe is mounted upon a pivot pin 112 carried by the frame of the carriage 23. A depending arm 113 is formed on the shoe and this arm has connected therewith a contractile coil spring 114 which normally tends to hold the shoe in a raised elevated position above the carriage. The opposite end of the shoe on the pivot pin 112 has pivotally connected therewith an operating link 115, the lower end of which is in turn pivotally connected to an actuating lever 116. This actuation lever is pivoted as at 117 on the frame of the carriage 23 at one side of the bell crank levers 70. The free ends of the levers 116 can be provided with operating heads which are disposed directly above the laterally extending handles 73 formed on the bell crank levers 70. When the desired trip lever 107 is in a lowered position, the same will be disposed in the path of the shoe 111 and consequently, the shoe will be depressed thereby. The depression of the shoe will swing the levers 116 downward and actuate the bell crank levers 70. The bell crank levers in turn will lift up on the release and lock head 70 and allow the opening movement of the jaws of the grapple.

I provide novel means for operating the bell crank lever 53, and the trip levers 107 and the release rod 101 from a central point adjacent to the hay stack, so that a single operator can conveniently actuate the device. This means embodies a cord 118 which is connected to the crank lever 53. This cord 118 is trained over guide pulleys 119 and the free end thereof can terminate in a hand grip adjacent to the hay stack. Each of the release levers 107 has attached thereto a pull cord 120. Each of the pull cords 120 is trained over guide pulleys 121 and the free ends of all of the pull cords 120 terminate adjacent to the free end of the pull cord 118. A pull cord 122 is provided for the release rod 101 and this pull cord can be trained over a pulley 123 and the free end thereof terminates adjacent to the free ends of the other pull cords. The free ends of all of the pull cords 120 and 122 can have attached thereto eyes 124, which can be hooked over hooks 125 secured to a suitable support for holding the cords in their desired adjusted position. Any one of the trip levers 107 can be held in a raised position by pulling downward on its cord 120 and hooking the loop 124 thereof over an adjacent hook. Likewise, the release rod 101 can be held in a raised position against the tension of its spring by pulling down on the cord 122 and placing the loop thereof over an adjacent hook 125.

Normally the release rod 101 is held in a raised position by its cord 122 so that the nose 103 thereof will be held against swinging movement and in the path of lugs 94 carried by the stop block 90. Thus, when the release rod is in its raised position, inward movement of the stop block 90 is prevented. However, when the hay is to be carried from the stack to the right-hand end of the track (referring to Figure 1 of the drawings) the cord 122 is released and the rod 101 is permitted to be lowered. This will position the nose 103 below the lugs 94. Considering that the grapple is moving to the right toward the stop 82, the head 106 of the release block 77 will ride up the inclined face of the release arm 95. This will permit the release of the clamp 76 and allow the grapple to lower to engage the load. As the head 106 rides over the release arm 95 the same will engage the release block 90 and slide the same rearwardly. The sliding movement of the stop block 90 will force the hooked end 92 thereof over the bridge piece 97. This movement is caused by the inclined faces of the hook 92 and the bridge piece. As the hooked end rides over the bridge piece the same will rock the release arm on the pivot pins 100 and elevate the release arm to a horizontal position, as shown in Figure 8 of the drawings. After the grapple has engaged the load and the grapple is elevated the reel 35 is moved to a neutral position and the weight will pull the carriage to the right. In view of the fact that the release arm 95 is in a raised position, the head 96 will ride under the release arm and through the frame 24. The head 106 will ride past the nose 103, as the same will rock freely on its pivots. The carriage can now be moved as far as desired to the right-hand end of the track and the load can be released by manipulating the desired release lever 107.

Upon the return movement of the carriage the head 106 will strike the swinging nose 103 of the stop and swing the same to the left. The inclined surface of the nose riding on the inclined face 104 of the block 90 will move the same outward consequently allowing the dropping of the release arm 95 to its normal lowered position. Thus, upon the return movement of the carriage toward the stop the head 106 will again ride up the release arm to cause the automatic releasing of the grapple so that the same can move to a lower position.

From the foregoing description, it can be seen that I have provided an exceptionally simple form of hay hoist and carrier which operates substantially automatically to engage and release the load.

Changes in details may be made without departing from the spirit or the scope of the invention, but what I claim as new is:

1. In a combined hoist and conveyor, a supporting track, a carriage mounted on the track for traveling movement, a load supporting member including a pair of pivoted jaws, releasable means for holding the jaws in a closed position including a sliding release and lock head, a bell crank lever rockably mounted at its angle having one of its arms connected with the release and lock head, a pivoted shoe connected with the carriage, an actuating lever operatively connected with the shoe for actuating the bell crank, and a trip connected with the track movable into and out of the path of the shoe.

2. In a combined hoist and conveyor, an overhead track, a carriage mounted on the track for traveling movement, a load carrying member connected with the carriage and including a pair of pivotally connected jaws, releasable means normally holding the jaws in a closed position including a release and lock head, a bell crank for actuating the release and lock head, a pivoted shoe connected with the carriage, a resilient means normally holding the shoe in an elevated position above the carriage, an actuating lever for the bell crank operatively connected with the shoe, a plurality of pivoted trips connected with the track, and independent means for controlling the position of the trip levers relative to the shoe.

3. In a combined hoist and conveyor, an overhead track, a carriage slidably mounted on the track, a load supporting member, a carriage controlling cable extending from the opposite ends of the carriage, means clamping the cable rigidly to one end of the carriage, an idle pulley supported by the opposite end of the carriage for receiving the cable, a load supporting member, a pulley block on the load supporting member engaging the cable intermediate the clamp and idle pulley, means acting on one end of the cable normally urging the carriage toward one end of the track, means acting on the opposite end of the cable for urging the carriage toward the other end of the track, releasable means connected with the carriage engaging the pulley block for normally holding the load supporting member in a raised position including a sliding release and lock head, a stop on the track intermediate the ends thereof including an open frame, a pivoted release arm connected with the frame normally arranged at an angle to the horizontal, and a trip head on the combined release and lock head for traveling movement on the release arm, whereby to raise the combined release and lock head, as for the purpose specified.

4. In a combined hoist and conveyor, an overhead track, a carriage slidably mounted on the track, a load supporting member, a carriage controlling cable extending from the opposite ends of the carriage, means clamping the cable rigidly to one end of the carriage, an idle pulley supported by the opposite end of the carriage for receiving the cable, a load supporting member, a pulley block on the load supporting member engaging the cable intermediate the clamp and idle pulley, means acting on one end of the cable for normally urging the carriage toward one end of the track, means acting on the opposite end of the cable for urging the carriage toward the other end of the track, releasable means connected with the carriage engaging the pulley block for normally holding the load supporting member in a raised position including a sliding release and lock head, a stop on the track intermediate the ends thereof including an open frame, a pivoted release arm connected with the frame normally arranged at an angle to the horizontal and a trip head on the combined release and lock head for traveling movement on the release arm, whereby to raise the combined release and lock head, and means for raising the release arm above the trip head, as for the purpose specified.

5. In a combined hoist and conveyor, a supporting track, a carriage slidably mounted on the supporting track, a carriage controlling cable extending from the opposite ends thereof and a clamp securing the cable to one end of the carriage, an idle pulley connected to the opposite end of the carriage receiving the cable, a load supporting member, a pulley block connected with the load supporting member and engaging the cable intermediate the clamp and idle pulley, a weight acting on one end of the cable for urging the carriage toward one end of the track, a power operated drum acting on the opposite end of the cable for moving the carriage toward the other end of the track against the influence of said weight, releasable means connected with the carriage and engaging the load supporting member for holding the same against downward movement on the cable including a pair of gripping members for engaging the pulley block, a sliding release and lock head engaging the gripping members for holding the same against movement, a trip head on the upper end of the release and lock head, a stop secured to the track intermediate its ends including an open frame, a pivoted release arm normally disposed in an inclined plane and in the path of the release head, a sliding stop block mounted in the frame, means on the stop block for rocking the release arm to a raised position above the release head, and manual controlled means on the frame for holding the stop block against movement.

JOSEPH RUHLAND.